United States Patent [19]

Albertini

[11] 4,179,878
[45] Dec. 25, 1979

[54] IMPROVED COUPLING LINK
[75] Inventor: Rocco D. Albertini, Concordville, Pa.
[73] Assignee: Baldt Incorporated, Chester, Pa.
[21] Appl. No.: 822,911
[22] Filed: Aug. 8, 1977
[51] Int. Cl.² .......................................... F16G 15/04
[52] U.S. Cl. ........................................ 59/85; 114/293
[58] Field of Search ................................. 59/85–89; 16/108, 169; 114/113–115, 293, 294

[56] References Cited

U.S. PATENT DOCUMENTS

| | | | |
|---|---|---|---|
| 479,208 | 7/1892 | Enschede | 59/86 |
| 550,417 | 11/1895 | Miller | 59/86 |
| 2,777,284 | 1/1957 | Page | 59/85 |
| 2,824,421 | 2/1958 | Nelson | 59/85 |
| 2,972,223 | 2/1961 | Devonshire et al. | 59/88 |
| 3,373,560 | 3/1968 | Manney et al. | 59/88 |
| 3,453,822 | 7/1969 | Crook, Jr. | 59/85 |
| 3,931,782 | 1/1976 | Childers et al. | 114/294 |
| 3,994,127 | 11/1976 | Gower | 59/85 |

FOREIGN PATENT DOCUMENTS 311049  5/1929  United Kingdom ................ 59/86

*Primary Examiner*—Jesus D. Sotelo
*Attorney, Agent, or Firm*—Cushman, Darby & Cushman

[57] ABSTRACT

The disclosure embraces a mooring system of the type used to anchor floating bodies with a vessel having a plurality of rollers for taking up and laying sections of cable which are joined together by an improved hinge link; at one end, the cable is secured to a floating body, at an intermediate portion to an anchor and, at its other end, when the system is installed, to the body that is to be moored; the sections of mooring cable are joined together by a hinge link having two U-shaped half-links where the free ends of the U-shaped half-links are formed with fingers having through bores which interfit with the fingers on the other half-link; a retaining pin is provided with a head and shank portion which fits through the bores of the fingers; the head of the pin has a flat side to prevent the pin from rolling when placed on a surface; the shank of the pin is provided with a bore intermediate its ends for receiving a cotter pin and the midpoint of the shank of the pin is provided with flat sections to permit grasping and rotation of the pin by a tool to facilitate insertion and removal of the cotter pin.

2 Claims, 5 Drawing Figures

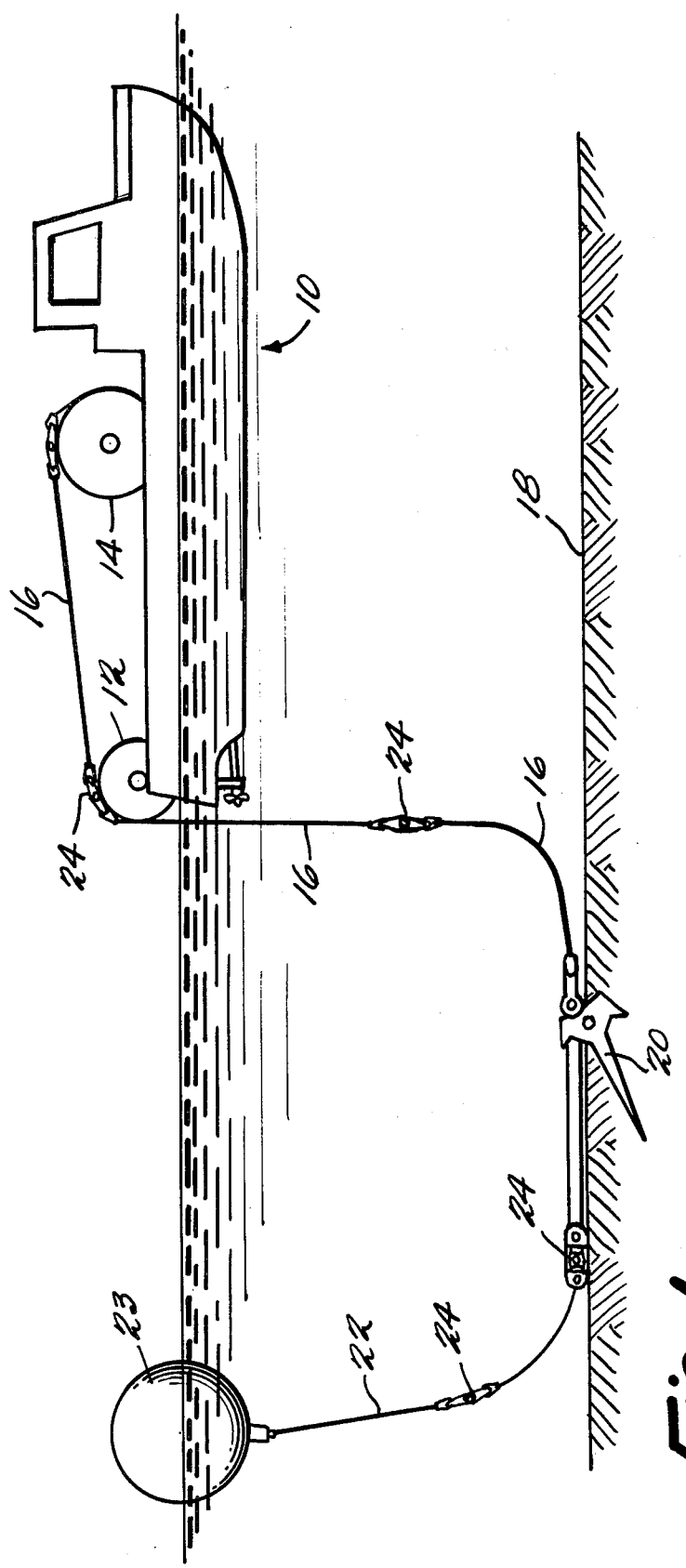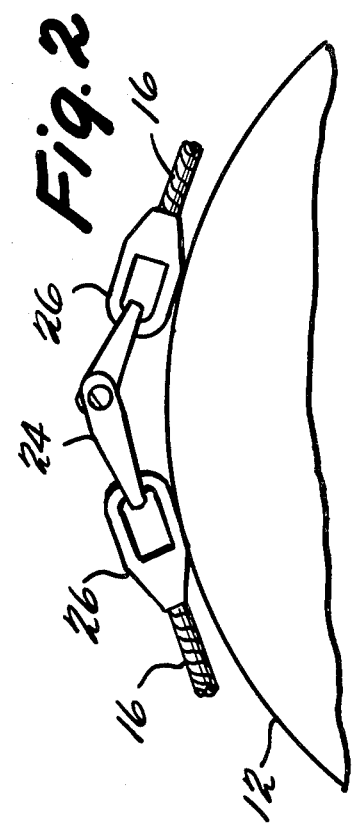

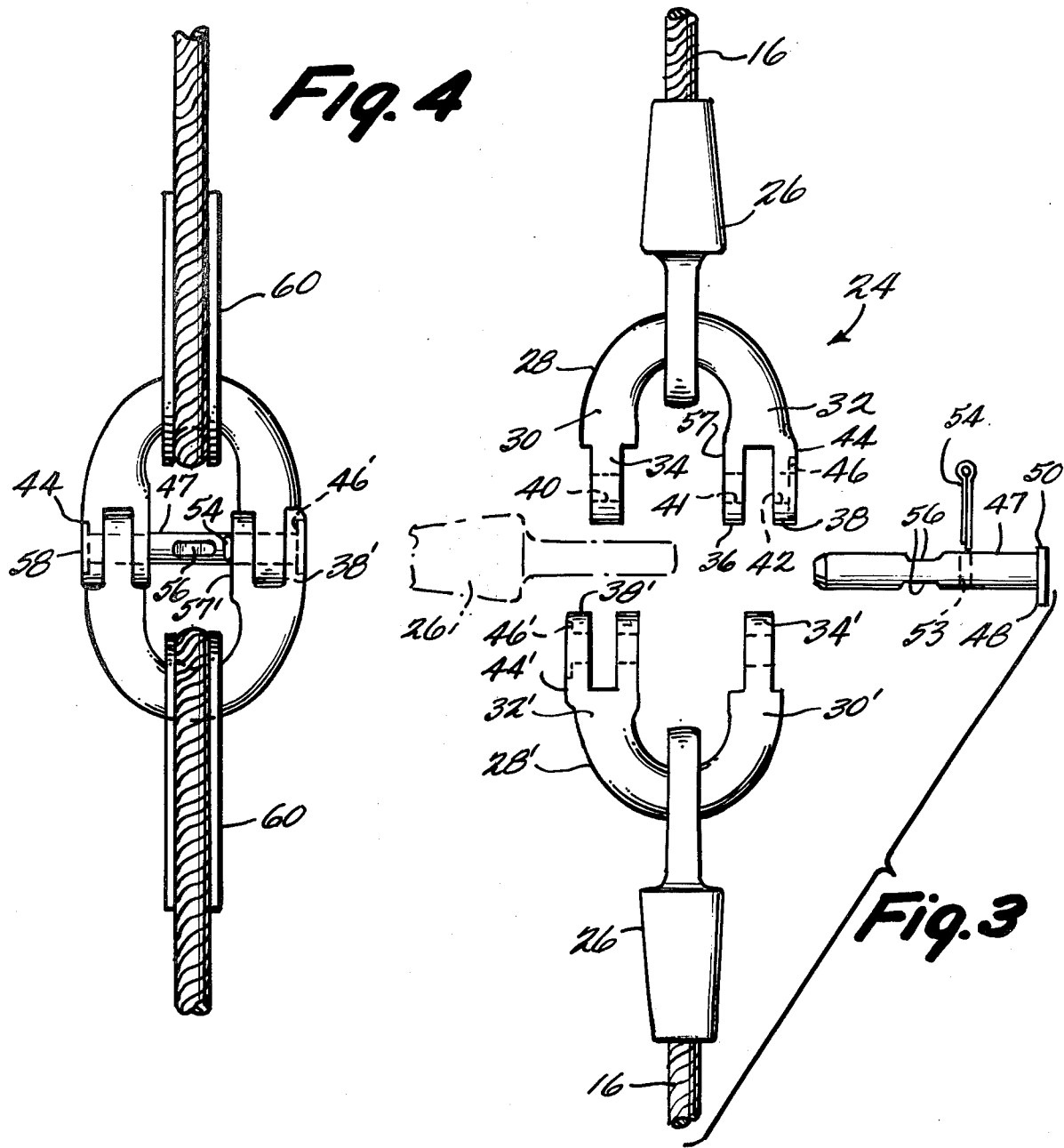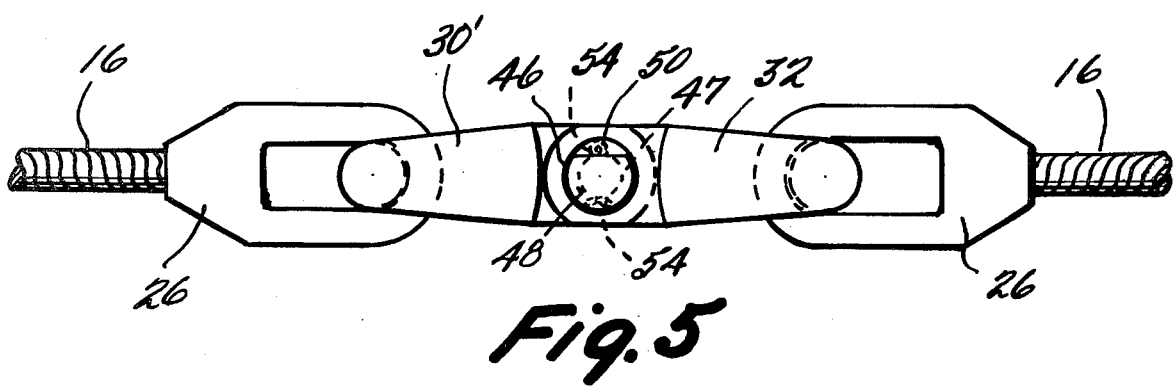

IMPROVED COUPLING LINK

BACKGROUND AND BRIEF SUMMARY OF THE INVENTION

The present invention relates to a mooring system for floating bodies such as buoys, drilling rigs, cargo ships or the like. More specifically, the mooring system of the present invention employs an improved hinge link to connect the lengths of cable where the hinge link is capable of flexing about an axis, such as where the cables are taken up on a drum or winch, without damaging or abrading adjacent cable sections.

In the field of mooring floating bodies, such as buoys, drilling rigs, ships, or the like, it is the practice to use specifically designed vessels for handling the mooring apparatus. Such vessels are conventionally equipped with a take-up winch or drum amidships and a stern roller such as the arrangement disclosed in U.S. Pat. No. 3,889,621. In the installation or disassembly of a mooring system, cable is either fed out or taken up by the main winch, located amidships, with the cable passing over the stern roller in the mooring operation. Typically, as water depths vary, so must the number of joined cable sections vary in a mooring system. Thus, efforts in this field have been directed toward developing a hinge link which is employed to join cable sections securely together.

A number of hinge link structures are known where the link is capable of assembly to join chain links and flexing or pivoting of the link sections about a hinge axis. For example, see U.S. Pat. Nos. 2,369,344, 2,777,284, 2,972,223, 3,828,550, 3,899,873, and 3,994,127.

The use of lengths of chain in a mooring system has proved to be cumbersome and time-consuming in view of the great weight of such chains and the space which they occupy when stored. Accordingly, wire cable sections have come to be used in the place of chains in many mooring applications. However, in establishing connections or hook-ups between sections of wire cable, it has been the practice to employ U-shaped shackles which are closed by means of a threaded bolt in establishing the hook-up. For example, manufacturers provide the cable sections, at their ends, with hawser thimbles or spelter sockets to facilitate the interconnection between cable sections. The U-shaped shackles would be employed either with or without the hinge links of the prior art to effect such hook-ups since the U-shaped shackles could be easily disassembled when it was desired to remove or add sections of cable to the mooring line.

The hinge links of the prior art, in general, have been employed to establish connections between sections of chain which connections were intended to be of a permanent nature. Thus, the hinge links of the prior art were intended to function as substitutes for a damaged link in a chain and thus are difficult, if not impossible, to open once installed without damaging or destroying the hinge link itself. In other forms of hinge links for lengths of chain, where the link could be disassembled, the assembled hinge link structure was characterized by having sharp protruberances much like the bolt connection of the U-shaped shackles so that, where such hinge links and/or U-shaped shackles were used with wire cable, the wire cable would become abraded and the strands cut by the hinge links or shackle bolts when the cable rubbed against these elements.

Still other types of chain links have been proposed but such are not useful with cable-type mooring systems since they either do not provide the ability in the link of hinging about an axis or are disassembled by virtue of such hinging such as in U.S. Pat. No. 418,812 and thus do not provide secure connections.

The present invention overcomes the foregoing difficulties by providing a mooring system wherein sections of cable can be quickly and easily joined together, as desired, in the system without danger of the connections damaging the structure of the wire cables either during the laying or taking up of the mooring system or storage of the cable on a drum. The invention includes an improved hinge link structure used in the combination and which is distinguished by the ease with which the hinge link can be assembled and disassembled in making and breaking connections between cables. In addition, the hinge link of this invention will be substantially less expensive to manufacture than those heretofore available but which will provide a durable and reliable link under a broad range of operating conditions and environments.

The mooring system of the present invention includes sections of wire cable with each section of cable having an attachment loop in the form of either a hawser thimble or a spelter socket securely attached to each end of each cable section. The spelter sockets or hawser thimbles of adjacent wire cables are joined together by the improved hinge link of the present invention so that no sharp edges or protruberances exist at the connections which can damage the structure of the wire cable during either the laying or taking up of the cables. The hinge link comprises two identically shaped, smooth surfaced half-link sections each of which are U-shaped and provided at the free ends of each of the legs of the U-shaped sections with pin-receiving portions having aligned transverse bores. On the outside surface of each of the legs, a recess is provided having means for receiving the head of a retaining pin so that the head will be flush with the surface of the leg. The retaining pin is provided with a bore spaced along the axis thereof a selected distance from the head, the bore being adapted to receive a cotter pin which, when inserted in the bore of the retaining pin, will abut the interior surface of a pin-receiving portion of a half-link to restrain the pin from axial movement in the transverse bores of the pin-receiving portions of the half-link. Means are also provided for facilitating grasping and rotating of the retaining pin to simplify the steps of removing same when it is desired to assemble and disassemble the hinge link.

With this arrangement a secure connection can be quickly established between wire cable sections and yet can be very easily undone while the hinge link is characterized by its smooth surface which eliminates the possibility of damage to the wire cable.

The foregoing and other features will make the hinge link of this invention particularly useful in a mooring system for a drilling rig, vessel or buoy since, as previously noted, as water depths vary, so must the number of joined cable sections vary in a mooring system. The ease with which cable sections can be added or removed from the system is, of course, primarily dependent on the type of hinge link member employed.

Other features, advantages or objects of the present invention will become apparent from the following description of an embodiment of the invention taken in conjunction with the accompanying drawings, in which:

BRIEF DESCRIPTION OF THE DRAWINGS

FIG. 1 is a schematic illustration of a mooring system in which hinge links of the present invention are employed;

FIG. 2 is an enlarged detailed view of a section of FIG. 1;

FIG. 3 is an exploded view of the hinge link of the present invention;

FIG. 4 is an assembled view of the hinge link of the present invention; and

FIG. 5 is a side view in elevation of an assembled link according to the present invention.

DETAILED DESCRIPTION OF THE INVENTION

Referring now to the drawings, wherein like numerals designate corresponding parts throughout the several views, there is shown in FIG. 1 a schematic view of a buoy mooring system to which the present invention is directed. Specifically, there is illustrated a vessel 10 which carries on its deck a pair of cable drums 12 and 14 with drum 12 being of smaller diameter than the main drum 14. Sections of cable 16 extend from drum 14, over drum 12 to the sea bed 18 where an anchor system 20 is being installed. The anchor system 20 is connected to a cable 22 which, at its upper end, is connected to a marker buoy 23 or other floating body such as a drilling rig or the like. As the depth of the water varies, the length both of the cable 22 and the anchor system laying cable, which, eventually may be attached to a floating body, must be changed. Thus, the hinge link connections 24 are employed to install or remove cable sections 16 from the line.

Referring now to FIG. 2, there is shown a close-up view of the drum 12 on vessel 10 where a hinge link 24, is being passed over the circumference of the drum 12. In such a case, the hinging action of the hinge link 24, such as is shown in FIG. 2, reduces the chance of damaging or breaking the hinge link 24 where large tension forces are exerted thereon such as can be experienced where massive anchor systems are being installed or where heavy seas periodically impose large loads on the connecting links.

It will be appreciated that when the cable is passed several times around drum 14, sections of the cable 16 will be in contact with the spelter sockets 26 and various hinge links 24. As will be apparent from the description that follows, the hinge link connection with the spelter sockets provides a substantially smooth connection between adjacent cable sections so that abrading of the wire cable is avoided yet the breaking of the connection between the spelter sockets 26 by disassembly of the hinge link 24 can still be easily effected.

Referring now to FIG. 3, there is illustrated an exploded view of the elements of the hinge link 24 of the present invention in combination with two spelter sockets 26 which are securely mounted on the ends of cable sections 16.

The hinge link 24 is constructed with two identically shaped half links 28 and 28'. In the description that follows, then, the portions of half link 28 will be described and it will be understood that the illustrated elements of half link 28' are identical and will be distinguished by the primed numerals, hereinafter, corresponding to the unprimed numerals designating the corresponding parts of half link 28.

The hinge links 28 and 28' are U-shaped and are made from a forged or cast metal that is resistant to sea water corrosion and have a smooth surface. Each leg 30 and 32 has at its free end a pin-receiving portion in the form of a finger 34 for leg 30 and a pair of fingers 36 and 38 for leg 32. The space between fingers 36 and 38 is such that finger 34' on leg 30' will closely interfit as shown in FIG. 4.

Each of the fingers 34, 36 and 38 are provided with a transverse circular bore as at 40, 41 and 42 which are all axially aligned as illustrated. On the outside surface 44 of finger 38 there is provided a recess 46 surrounding the opening of bore 42. Recess 46 has a substantially circular circumferential wall. Of course, the same recess 46' and wall are provided on finger 38'.

The retaining hinge pin 47 has a shank portion that is generally circular in cross section along its axial length and has a diameter slightly smaller than the diameters of the circular bores 40, 41 and 42. At one end thereof, pin 47 has a flat head 48 which has an axial width substantially equal to the depth of recess 46 so that the head 48 will lie flush with the surface 44. The flat section 50 on the head 48 is provided to prevent the pin 47 from rolling when placed on a surface.

As shown in FIG. 5, recess 46 has a diameter slightly larger than the diameter of the head 48 so that, where the pin 47 is inserted in the bores of the interdigitated fingers of the assembled hinge link, relative rotation between the pin 48 in the bores relative to half links 28 and 28' is permitted.

The shank portion of pin 47 is provided with a pin bore 53 through which a cotter pin 54 is inserted when the pin 47 has been inserted through the aligned bores of the two half links' pin-receiving portions. The distance between the bore 53 and the underside of the head 48 must be very close to the perpendicular distance between the surfaces 44 and 57 of fingers 38 and 36, respectively, so that when the hinge link is assembled, the protruding, deformed end portions of cotter pin 54 and head 48 will serve as retaining means for the pin 47.

In establishing a connection between cables 16, as shown in FIG. 3, a spelter socket 26 is inserted from the dotted line position over the finger 34 of half link 28. The same, of course, will be done with the spelter socket that is fitted on half link 28'.

At the mid-section of the shank portion of the pin 47, flattened recesses 56 are provided to facilitate the grasping and rotation of the shank portion of the pin 47, particularly during insertion or removal of the cotter pin and removal of the retaining hinge pin 47 and disassembly of the hinge link 24.

As shown in FIG. 4, the in 47 may be inserted with the head 48 cooperating with the recess 46' of finger 38' since recess 46', as previously noted, is identical in shape and depth to the recess 46 on finger 38 and pin 47 will be interchangeable with all other hinge links of a set. It should be noted, from FIG. 4, that the ends of cotter pin 54 abut against the surface 57' to prevent any axial movement of the pin 47 in the aligned bores of the fingers of the half links. Also, the overall axial length of pin 47 should be such that the end 58 of the pin 47 does not protrude beyond the surface 44 when the elements are assembled.

The lack of projections on surfaces 44 and 44' eliminates the possibility of dislodging pin 47 where the hinge link strikes a surface of the vessel and also maintains the exterior surface of the link 24 in a smooth condition which avoids damage to the cables 16 during reeling under high tension over the links 24. The cotter pin in the assembled link lies within the thick portions of legs 32, 32' thus protecting the cotter pin from damage and dislodgment from bore 53. When the link shown in FIG. 4 is to be disassembled, instead of turning over the link which may be under large tension, a worker may simply grasp with a wrench the flat recesses 56 and rotate the pin 47 to expose the ends of cotter pin 54. A worker need then simply unfasten the cotter pin 54 and grasp the flattened recesses 56 of the pin 47 with a suitable wrench tool to shift the pin 47 axially of the bores of the fingers. A firm grasp on the pin 47, as is provided by the flat recessed 56, is often needed where the hinge link 24 has been left underwater for a period of time. Clearly, the hinge link 24 can be employed with the conventional hawser thimbles 60 as well as the spelter sockets 26.

Having described the invention, it will be apparent that various modifications may be made thereto without departing from the spirit and scope of the present invention as is defined by the appended claims.

What is claimed:

1. A coupling link comprising:

two similarly constructed generally U-shaped half links each having two legs with one leg terminating in a single pin receiving portion and the other leg terminating in a pair of pin receiving portions, each of said pin receiving portions of each half link having a cylindrical bore extending therethrough with the axis thereof aligned with the axes of the other two bores, the pair of pin receiving portions of each half link being spaced apart in an axial direction with respect to the common axis of said bores so as to provide an axially outward pin receiving portion having an axially outer surface and an axially inward pin receiving portion having an axially inner surface, said half links being assembled with the single pin receiving portion of each half link fitted axially between the axially inward and outward pin receiving portions of the other half link and all of said bores in axial alignment, the axially outer surface of each axially outward pin receiving portion having an annular recess therein surrounding the bore thereof, a pin having a cylindrical shank engaged within said bores and an enlarged head on one end thereof disposed within the annular recess in the axially outward pin receiving portion of one half link, the opposite end of said pin being disposed axially inwardly of the axially outer surface of the other half link, the cylindrical shank of said pin having a pair of parallel flat surfaces formed in the exterior periphery thereof in a position between the axially inward pin receiving portions of said half links and a transversely extending opening therethrough adjacent the axially inward surface of the axially inward pin receiving portion of said one pair, and a cotter pin extending through said opening and disposed in operative engagement with the axially inner surface of the axially inward pin receiving portion of said one pair, the arrangement being such that by engaging a turning tool with said parallel flat surfaces said cylindrical shank can be moved rotationally within said bores with respect to both of said half links and held into a position enabling said cotter pin to be readily removed from said opening and placed therein.

2. A coupling link as defined in claim 1 wherein said enlarged head is generally circular in plan with a flat surface formed in the periphery thereof having a chordal relationship with said shank.

* * * * *